(12) United States Patent
Wilmer et al.

(10) Patent No.: US 6,909,706 B2
(45) Date of Patent: Jun. 21, 2005

(54) MULTICAST WIRELESS AD HOC PACKET ROUTING

(75) Inventors: Michael E. Wilmer, Portola Valley, CA (US); Jerry W. Rice, Los Altos, CA (US); Robert Mehranfar, Brisbane, CA (US); John Murray, Palo Alto, CA (US); Paul Munro, Mountain View, CA (US)

(73) Assignee: Pemstar, Inc., Rochester, MN (US)

( * ) Notice: Subject to any disclaimer, the term of this patent is extended or adjusted under 35 U.S.C. 154(b) by 928 days.

(21) Appl. No.: 09/866,097

(22) Filed: May 23, 2001

(65) Prior Publication Data

US 2002/0176399 A1 Nov. 28, 2002

(51) Int. Cl.[7] ................................................ H04Q 7/24
(52) U.S. Cl. ...................... 370/338; 370/432; 455/421
(58) Field of Search ................................ 370/338, 310, 370/315, 328, 351–3, 389–392, 400–405, 428–9, 431–433, 437, 449–450, 252; 455/421, 456

(56) References Cited

U.S. PATENT DOCUMENTS

| | | | | |
|---|---|---|---|---|
| 5,987,011 | A | * 11/1999 | Toh | 370/331 |
| 6,377,608 | B1 | * 4/2002 | Zyren | 375/132 |
| 2002/0075940 | A1 | * 6/2002 | Haartsen | 375/132 |
| 2002/0122410 | A1 | * 9/2002 | Kulikov et al. | 370/349 |
| 2002/0164963 | A1 | * 11/2002 | Tehrani et al. | 455/101 |

* cited by examiner

*Primary Examiner*—David Vincent
(74) *Attorney, Agent, or Firm*—Dorsey & Whitney, LLP

(57) ABSTRACT

A wireless LAN communications system capable of supporting communications within a multidisciplinary group or team of individuals, comprising a plurality of LAN radios that transmit, receive and route messages. Radios that are within range of each other send messages directly to each other. Radios that are within two hops of each other extract route information from the specific roles within the group and periodic update messages sent by the LAN radios. Radios that are more than two hops from each other use modified ad hoc multicast routing protocols.

16 Claims, 1 Drawing Sheet

MULTICAST WIRELESS AD HOC PACKET ROUTING

FIELD OF THE INVENTION

The present invention to wireless communications systems and in particular to a method for utilizing LAN radios to transmit, receive and route communications among a group.

BACKGROUND OF THE INVENTION

The Land Warrior Program represents one aspect of the Army's efforts to modernize the soldier. The Land Warrior Program will make rapid deployable light forces more effective on the future battlefield. Specifically, an integrated, modular fighting system for the infantryman is being developed by employing existing and developing technologies. Examples of Land Warrior objectives include reducing weight and cost by consolidating functionality, integrating components from similar systems, and providing capability enhancements. Thus, the Land Warrior system includes everything the ground soldier wears and carries integrated into a close combat fighting system which enhances his situational awareness, lethality, survivability, mobility, sustainment, and training.

One key element of the Land Warrior program comprises a sophisticated communication system that allows every soldier to know where he is, where the enemy is, where his buddies are and what he is to do. A military organization is characterized by its hierarchy, which generally comprises a number of specific roles as well as discrete subgroups of individuals. Specific roles within the military organization include hierarchies of leaders, platoons, divisions and the like. In addition, the organization also comprises subgroups or subsets, for example, team leaders or $2^{nd}$ squad members. Effective communication within such an organization requires the ability to send messages from individual to individual as well as to all individuals having a specific role or being a member of a specific subgroup. Together with this ability to target messages, efficiency and clarity require that messages not be delivered to roles or subgroups for which they are not intended.

Prior art systems utilize routing protocols suitable for mobile clients. One example is On Demand Multicast Routing Protocol (ODMRP). This process requires the propagation of route discovery messages and corresponding acknowledgements to build routing tables. The routes generated by this general process do not support bi-directional communications because ODMRP is designed to support multicast messages that are one-to-many in nature. This general process also requires the discovery and maintenance of routes for each of the several group membership multicast addresses that are associated with a particular destination node.

Accordingly, it is an object of the invention to provide a wireless communication method for delivering messages to specific roles or subgroups within any organization or team having defined roles or subgroups. It is another object of the invention to provide such communications in such a way as to allow bi-directional communications between the various roles and subgroups. It is a further object of the invention to optimize the routing of information within a multidisciplinary organization.

SUMMARY OF THE INVENTION

This disclosure relates to a wireless LAN communications system capable of supporting communications using wireless LAN radios utilizing IP packet communications that have receiving, sending and routing functions. The method of the invention generally comprises the steps of providing at least a first LAN radio, a second LAN radio and a third LAN radio, wherein the first LAN radio and the second LAN radio are not within range of each other, but are each within range of the third LAN radio, broadcasting a periodic update message from the first LAN radio comprising information that the second LAN radio is not within range of the first LAN, receiving the first LAN radio periodic update message with the third LAN radio, determining that the first LAN radio and the second LAN radio are within range of the third LAN radio, and updating a database of the third LAN radio with route information to indicate a route between the first LAN radio and the second LAN radio through the third LAN radio.

Preferably, the route information is then sent from the third LAN radio to the first or second LAN radios. The LAN radios of the invention are also preferably assigned a role based multicast IP address corresponding to a particular role within a group utilizing the communication system. In one embodiment, a route confirmation message is sent upon receipt of the route information. Alternatively, confirmation can be contained in a subsequent periodic update message.

For messages requiring a route that cannot be determined from the role based multicast IP addresses and periodic update messages, conventional multicast routing protocols can be used, such as ODMRP. In such examples, the communication system comprises a fourth LAN radio that is not within range of the first LAN radio and the second LAN radio and is within range of the third LAN radio. First, a route discovery message is sent. The route discovery message is broadcast by the first radio and received and transmitted by the second and third radios until it is received by the fourth radio. A route confirmation message is sent by the fourth LAN radio along the discovered route to the first LAN radio, which enables the first LAN radio to send a message to the fourth LAN radio. Preferably, all routes are discovered for the role based multicast IP addresses. Thus, the route established between the first and fourth LAN radios is bi-directional since it is one-to-one.

In another embodiment of the invention, the wireless communication system comprising a plurality of LAN radios uses a method of routing messages comprising the steps of assigning role based multicast IP addresses to each of the LAN radios corresponding to specific roles within a group using the communication system, sending messages between LAN radios that are within range of each other directly to a receiving LAN radio, sending messages between LAN radios that are within k hops of each other by extracting route information from a routing table database established from the specific roles within the group and periodic update messages sent by the LAN radios, and sending messages between LAN radios that are more than k hops from each other by sending route discovery messages and applying ad hoc multicast routing protocols.

BRIEF DESCRIPTION OF THE DRAWINGS

Further features and advantages will become apparent from the following and more particular description of the preferred embodiments of the invention, as illustrated in the accompanying drawing, and in which like referenced characters generally refer to the same parts or elements throughout the views, and in which.

DETAILED DESCRIPTION OF THE PREFERRED EMBODIMENT

Figure 1:
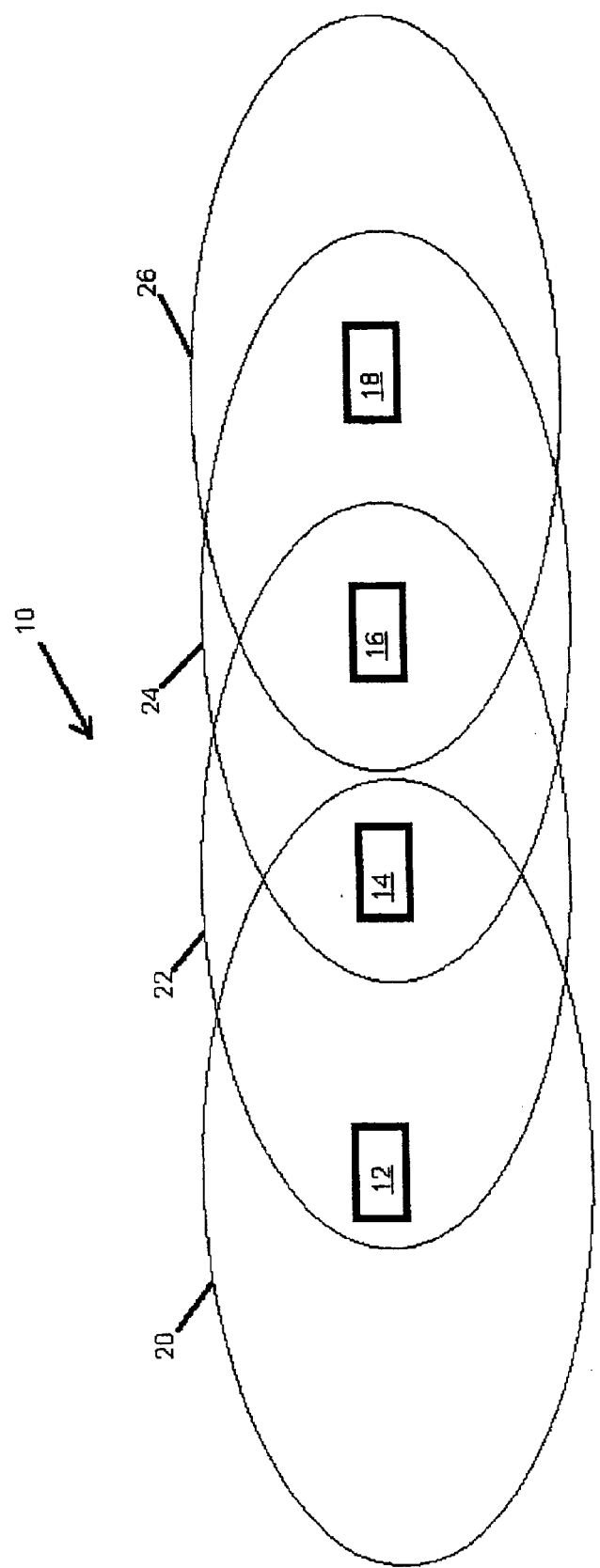
FIG. 1 is a schematic of the wireless LAN communication system suitable for use with the invention.

This disclosure relates to a wireless LAN communications system capable of supporting communications within a multidisciplinary group or team of individuals, each person equipped with a wireless LAN radio and assigned to one of a number of possible roles in carrying out the mission of the team. Each LAN radio transmits and receives messages, and participates in the routing of messages between other LAN radios that are not within direct range of each other. Messages are sent among the LAN radios as packets of information using Internet Protocol (IP).

Each LAN must have a unique identifier known as its IP address, which is referred to as its Intrinsic IP address. Members of the group should also be able to send messages to others based on their roles within the team (e.g. team leader, grenadier, etc.) as well as being able to send messages to particular subsets of the team as appropriate (e.g. squad leaders). Such role-based or group based routing of communication can be achieved using multicast IP addressing. Details of this role-based multicast IP (RBIP) addressing can be found in related U.S. Ser. No. 09/864,492, filed May 23, 2001, which is incorporated in its entirety by reference. To achieve these goals, a unique multicast IP address associated with the specific role is assigned to each LAN radio along with the intrinsic IP address. Further, a multicast IP address for a specific subgroup of the group is also assigned to the LAN radio as desirable. With this approach, the group can be very large (e.g. Third Army) and may be composed of a number of smaller units (e.g. Company A, First Platoon, Second Squad) and there can be a multicast address assigned to each unique role in the team. It may also be desirable to assign a set of multicast IP addresses to generic roles/subgroups which are not unique, to allow for the formation of ad hoc working teams under conditions in which unit integrity has collapsed and members of various organizations must work together as a team. Accordingly, a multicast IP address is assigned to each class within the group, wherein a class can correspond to a particular role, a specific subgroup or a generic role or subgroup.

Role-Based Multicast IP addressing creates some unique properties when applied to groups having defined hierarchies, such as the Army's Team/Squad/Platoon structure. First, due to the structured nature of RBIPs, all multicast addresses associated with a particular role can be calculated once the role and therefore the RBIP is known. This means that all route discovery can be conducted using the RBIP alone for each system-to-system (i.e. Role-to-Role) route. Thus, the route discovered in each case will be one-to-one, allowing it to be used bi-directionally.

Additionally, the nature of communications within groups such as military units, is such that most message traffic is confined to relatively few paths. For example, messages will commonly flow from a Squad Leader to his Team Leaders and possibly to his fellow Squad Leaders; messages from a Team Leader will most often be directed to his team or to his Squad Leader. On the other hand, it is quite unusual for a message to be sent directly from a Team Leader to a Platoon Leader. It is also true that the members who communicate most often are commonly located in relatively close proximity to one-another. Associated with each group member, depending upon his role, are a number of other members/roles that can normally be expected to be within range. For example, a SAW gunner would expect to have the other members of his team, his team leader and his Squad Leader normally visible. A Squad leader would be expected to have his Platoon Leader, his fellow Squad Leaders and his Team Leaders normally visible.

Accordingly, under normal circumstances (e.g. absence of strong jamming by the enemy) the great majority of message packets will be received directly by the intended systems, with no need for message forwarding or routing. LAN radios that are within one hop of each other are within range, or visible to each other. LAN radios that are within range of each other are termed neighbors. Even when one recipient is not within direct range of the sender, he will most likely be within range of one of the other members who did directly receive the message and can forward it. Thus, in the second most common case, the message requires only two hops. This leaves only a very small percentage, approximately five percent in a typical case, of messages which must use three or more hops to reach their destination.

Another characteristic of communication systems appropriate for use with military organizations or other multidisciplinary groups, is the need for situational awareness. Preferably, the communication system comprises the use of a periodic broadcast mode update message (PUM). This message contains the global positioning system (GPS) location of a given LAN radio and the corresponding RBIP. In addition, it will contain IP Address information revealing which LAN radios are within range.

As each member's PUM is being generated, it will be constructed to contain information regarding his own GPS location and RBIP as well as the RBIPs of LAN radios that are within range. Preferably, the information comprises a list of roles/members who should be normally within range of his LAN but are not, as this will typically require the transfer of less information. Alternatively, a complete list of all roles/members who are within range could be transmitted. Other methods of visible neighbor notification are also suitable.

When a given LAN radio receives a PUM from a neighboring transmitting LAN radio, the information it contains is used to update internal router forwarding tables or route information databases and to generate a message back to the transmitting LAN for any of the missing RBIPs that are within range of the receiving LAN. The existence of missing RBIPs visible to the receiving LAN radio allows the discovery of a two hop route from the transmitting LAN to the missing RBIPs, through the receiving LAN.

Accordingly, the routing information needed for two-hop message forwarding is always contained in the PUMs and no route discovery messages are needed. In a preferred embodiment, an additional route confirmation message follows each PUM. This provides equivalent functionality to a "Join Reply" message. The net effect of the PUM followed by the route confirmation message is to reconfirm the two-hop routing tables every time the PUM is sent. Alternatively, the responding system waits for its next PUM and includes a Route Confirmation code in its PUM. This eliminates the need for an extra route confirmation message but slightly increases the time required to re-establish a link.

As the mobile LANs move, obstacles are encountered and links are broken. When a link does break, the message data stream will be lost for at most a time equal to the PUM interval. For voice over IP (VOIP) messages, this will correspond to a short "breakup" of the speech channel. For data messages, it will result in lost packets and this will result in the reception of an incomplete message, causing the Application Level Acknowledge to fail. The failure to receive an acknowledge message signals the sending software application at the transmitter to resend the message.

All messages that are queued for transmission and for which a current route is not stored in the Routing Table of the transmitting system will automatically require a Route Discovery process to occur before the message can be sent. In a first embodiment, these represent messages that require more than two hops. Such messages are routed using protocols known to those of skill in the art, modified as suitable for the characteristics of the multidisciplinary group.

For example, Sung-Ju Lee discloses an On Demand Multicast Routing Protocol (ODMRP), published via the ITEF MANET Working Group, is suitable for use with the invention. The ODMRP protocol specifies that a client checks its routing table to determine if a route exists and has not timed out. If so, it is used and the message is sent. If not, a "Join Query" route discovery broadcast message is sent and when the first of those discovery packets reaches the specified destination system, it responds with a "Join Reply" message which works its way back to the initiator, along the discovered path, with each forwarding router system confirming the connections in its routing table. Following this route discovery process, the message is sent.

Preferably, the use of the ODMRP with the methods of the invention will further comprise the steps of discovering all routes for the RBIPs and establishing bi-directional routes. These modifications of the prior art ODMRP significantly reduce the overhead of the process without adding unnecessary complexity. They are also consistent with the procedures used in the two hop routing strategies, since they share the same Routing Tables, Forwarding Tables and Multicast Group calculation algorithms.

In routing a message, if a group Multicast address is specified as the destination, the forwarding systems along the route will use the Multicast Structure algorithm to look up the RBIPs belonging to the group and will then forward the message if any of those RBIPs are in their Forwarding Table. This places a larger burden on the media access control (MAC) layer software in each of the forwarding systems, but this is justified by the very significant reduction in route discovery/maintenance traffic. The ability to handle both individual and group related Multicast messages with a single route reduces route discovery traffic on the network by a factor of three to one or more In additional embodiments of the invention, other Ad Hoc Multicast Routing Protocols known to those of skill in the art may be used in conjunction with RBIP route discovery in the practice of the invention. In general, the structured nature of the RBIP addressing mapped to a multidisciplinary group permits the determination of routes that are within k hops. The example given above demonstrates the assumptions and route discovery used to for LAN radios within two hops. One of skill in the art will recognize modifications that allow similar route discovery situations where k equals 3 or more. The present invention uses the prior art ad hoc multicast routing protocols to accommodate routing requiring more than k hops.

FIG. 1 schematically shows a wireless communication system 10 of the invention, which generally comprises a plurality of LAN radios 12, 14, 16 and 18 that transmit, receive and route voice and data information in the form of IP packets. The LAN radios 12, 14, 16 and 18 each have a range 20, 22, 24 and 26, respectively.

In a first example, LAN radio 12 sends a message to neighboring LAN radio 14. Since radio 12 and 14 are within range of each other, no routing is necessary. Packets of information that are marked either with an intrinsic IP address or a RBIP address corresponding to LAN radio 14 are simply broadcast by radio 12 and received by all radios within range 20. Radio 14 recognizes the IP address of the transmitted packets and processes them appropriately.

In the next example, LAN radio 12 attempts to send a message to LAN radio 16. However, radio 16 is not within range 20 of radio 12. Thus, it is necessary to route the message through another LAN radio. Further, it would have been expected based upon the roles associated with radios 12, 14 and 16 that they would all be visible to each other. When radio 12 broadcasts its PUM, it identifies radio 16 as being out of range by including the RBIP address corresponding to radio 16 in its list of RBIPs that would be expected to be in range, but are not, as described above. Radios 12 and 16 are within range 22 of radio 14. When the PUM of radio 12 is received by radio 14, radio 14 updates its routing table to include itself as a link between radio 12 and radio 16. Further, radio 14 communicates the existence of a suitable route to radio 16 to radio 12. Thus, a link can be established between radio 12 and radio 16 that requires two hops through radio 14. Accordingly, when radio 12 attempts to send a message to radio 16, it can parse its router table database to determine that such a route exists through radio 14 and the message can be sent accordingly.

In another example, radio 12 attempts to send a message to radio 18. Radio 18 is not visible to radio 12, nor is it visible to any radio (radio 14) within range 20 of radio 12. Similarly, radio 12 is not within the range (range 24) of any radios (radio 16) within range 26 of radio 18. Therefore, the two hop routing strategies discussed above are not available and a conventional ad hoc multicast routing strategy, as discussed above, should be used. Generally, these require the transmittal of route discovery messages from radio 12 which are picked up and retransmitted by radios 14 and 16, subsequently. Since radio 18 is visible to radio 16, when the route discovery message is sent from radio 16 it will be received and acknowledged by radio 18. The first received route discovery message is propagated back to the sending radio 12 through radios 14 and 16, and the corresponding routing tables updated. Thus, a message can be sent from radio 12 to radio 18 along the discovered route, requiring three hops.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. In a wireless communication system comprising a plurality of LAN radios utilizing IP packet communication, a method comprising the steps of:

a) providing at least a first LAN radio, a second LAN radio and a third LAN radio, wherein said first LAN radio and said second LAN radio are not within range of each other, but are each within range of said third LAN radio;

b) broadcasting a periodic update message from said first LAN radio comprising information that said second LAN radio is not within range of said first LAN;

c) receiving said first LAN radio periodic update message with said third LAN radio;

d) determining that said first LAN radio and said second LAN radio are within range of said third LAN radio;

e) updating a database of said third LAN radio with route information to indicate a route between said first LAN radio and said second LAN radio through said third LAN radio.

2. The method of claim 1, further comprising the step of transmitting said route information from said third LAN radio to said first LAN radio.

3. The method of claim 2, further comprising the step of transmitting said route information from said third LAN radio to said second LAN radio.

4. The method of claim 1, further comprising the step of assigning said first LAN radio, said second LAN radio and said third LAN radio a role based multicast IP address corresponding to a particular role within a group utilizing the communication system.

5. The method of claim 4, wherein said group utilizing the communication system is a military organization.

6. The method of claim 1, wherein said step of broadcasting said periodic update message comprises broadcasting role based IP addresses corresponding to LAN radios expected to be within range of said first LAN radio but are not within range of said first LAN radio.

7. The method of claim 1, wherein said step of broadcasting said periodic update message comprises broadcasting role based IP addresses corresponding to LAN radios that are within range of said first LAN radio.

8. The method of claim 2, further comprising the step of transmitting a route confirmation message from said first LAN radio to said third LAN radio.

9. The method of claim 2, further comprising the step of transmitting a subsequent periodic update message comprising route confirmation information.

10. The method of claim 4, wherein the communication system includes a fourth LAN radio that is not within range of said first LAN radio and said second LAN radio and is within range of said third LAN radio, further comprising the steps of:
   a) broadcasting a route discovery message from said first LAN radio;
   b) receiving and transmitting said route discovery message with said second LAN radio and said third LAN radio;
   c) receiving said route discovery message with said fourth LAN radio;
   d) sending a route confirmation message along said discovered route to said first LAN radio; and
   e) sending a message from said first LAN radio to said fourth LAN radio along said discovered route.

11. The method of claim 10, further comprising the step of discovering all routes for the role based multicast IP addresses.

12. The method of claim 11, further comprising the step of establishing a bi-directional route between said first LAN radio and said fourth LAN radio.

13. In a wireless communication system comprising a plurality of LAN radios, a method of routing messages comprising the steps of:
   a) assigning role based multicast IP addresses to each of the LAN radios corresponding to specific roles within a group using the communication system;
   b) sending messages between LAN radios that are within range of each other directly to a receiving LAN radio;
   c) sending messages between LAN radios that are within k hops of each other by extracting route information from a routing table database established from the specific roles within the group and periodic update messages sent by the LAN radios; and
   d) sending messages between LAN radios that are more than k hops from each other by sending route discovery messages and applying ad hoc multicast routing protocols.

14. The method of claim 13, wherein said periodic update messages comprise information about which LAN radios are within range.

15. The method of claim 13, wherein said ad hoc multicast routing protocols establish routes for all role based multicast IP addresses.

16. The method of claim 15, wherein said ad hoc multicast routing protocols establish bi-directional routes.

* * * * *